United States Patent
Mickley et al.

(10) Patent No.: US 12,541,851 B2
(45) Date of Patent: Feb. 3, 2026

(54) SYSTEM AND METHOD FOR MATCHING OF BLOCK AND SLICE HISTOLOGICAL SAMPLES

(71) Applicant: Leica Biosystems Imaging, Inc., Vista, CA (US)

(72) Inventors: Mandel Mickley, Vista, CA (US); Robert Sykes, Newcastle (GB)

(73) Assignee: Leica Biosystems Imaging, Inc., Vista, CA (US)

( * ) Notice: Subject to any disclaimer, the term of this patent is extended or adjusted under 35 U.S.C. 154(b) by 280 days.

(21) Appl. No.: 18/210,261

(22) Filed: Jun. 15, 2023

(65) Prior Publication Data

US 2023/0326025 A1    Oct. 12, 2023

Related U.S. Application Data

(63) Continuation of application No. PCT/US2021/065551, filed on Dec. 29, 2021.
(Continued)

(51) Int. Cl.
*G06K 9/00* (2022.01)
*G06T 7/00* (2017.01)

(52) U.S. Cl.
CPC .. *G06T 7/0014* (2013.01); *G06T 2207/20081* (2013.01); *G06T 2207/20084* (2013.01); *G06T 2207/30004* (2013.01)

(58) Field of Classification Search
CPC ......... G06T 7/0014; G06T 2207/20081; G06T 2207/20084; G06T 2207/30004;
(Continued)

(56) References Cited

U.S. PATENT DOCUMENTS 10,043,273 B2    8/2018   Vink et al.
11,449,972 B2 *  9/2022   Luengo Hendriks ..... G06T 7/33
(Continued)

FOREIGN PATENT DOCUMENTS

CN    109993190 A    7/2019
CN    110674885 A    1/2020
(Continued)

OTHER PUBLICATIONS

Gao, Yan, et al. "Deep model-based semi-supervised learning way for outlier detection in wireless capsule endoscopy images." *IEEE Access* 8 (2020): 81621-81632.
(Continued)

*Primary Examiner* — Atiba O Fitzpatrick
(74) *Attorney, Agent, or Firm* — FBT Gibbons LLP

(57) ABSTRACT

Features are disclosed for imaging block and slice samples using an imaging system. The imaging system can link the images by identifiers associated with the block and slice samples. The imaging system can train a machine learning algorithm based on correctly linked images. In some embodiments, the trained machine learning algorithm may include an image analysis module or a convolutional neural network. The imaging system can use the trained machine learning algorithm in order to determine a confidence score of a match between the block and the slice samples. The trained machine learning algorithm can use features of the block and the slice samples such as shape and tissue morphology to determine whether the samples match. In some embodiments, when the confidence score is below a certain threshold, the imaging system can alert a user that the samples may not match.

20 Claims, 9 Drawing Sheets

Related U.S. Application Data

(60) Provisional application No. 63/132,345, filed on Dec. 30, 2020.

(58) Field of Classification Search
CPC ......... G06T 2207/30024; G06T 7/0012; G06T 7/30; G06T 2207/10056; G06T 2207/10061; G06T 9/002; G06T 5/60; G06V 20/69–698; G06V 2201/04; G06V 10/70; G06V 10/82; G06V 10/774–7796; G06V 10/454; G01N 15/1468; G01N 15/1475; G01N 2015/1006; G01N 29/4481; G06K 9/6256; G06K 9/6257; G06K 9/6259; G06N 3/02–126; G06N 20/00–20; G06F 18/214–2155; G06F 7/023; G06F 40/16
See application file for complete search history.

(56) References Cited

U.S. PATENT DOCUMENTS

| | | | | |
|---|---|---|---|---|
| 2017/0140107 | A1* | 5/2017 | Gurney | G01N 35/00732 |
| 2018/0137689 | A1* | 5/2018 | Eastwood | G06T 7/11 |
| 2018/0247101 | A1 | 8/2018 | Wimberger-Friedl et al. | |
| 2020/0160522 | A1* | 5/2020 | Merlo | B01L 9/52 |
| 2021/0110519 | A1* | 4/2021 | Luengo | G06T 7/33 |
| 2021/0263055 | A1* | 8/2021 | Mitra | G01N 35/00613 |
| 2022/0034768 | A1* | 2/2022 | Mitra | G06T 7/0014 |
| 2023/0117821 | A1* | 4/2023 | Ivie | G06V 20/698 |
| | | | | 382/128 |

FOREIGN PATENT DOCUMENTS

| | | |
|---|---|---|
| CN | 111311655 A | 6/2020 |
| CN | 112052868 A | 12/2020 |
| KR | 101554116 B1 | 9/2015 |
| WO | 2019/046774 A1 | 3/2019 |

OTHER PUBLICATIONS

International Search Report and Written Opinion dated May 2, 2022, for International Application No. PCT/US2021/065551, 9 pages.

First Chinese Office Action and Search Report dated Oct. 18, 2025, for Application No. 202180088788.4, 13 pages.

* cited by examiner

SYSTEM AND METHOD FOR MATCHING OF BLOCK AND SLICE HISTOLOGICAL SAMPLES

RELATED APPLICATION(S)

This application is a continuation of International Application Number PCT/US2021/065551, filed Dec. 29, 2021, entitled SYSTEM AND METHOD FOR MATCHING OF BLOCK AND SLICE HISTOLOGICAL SAMPLES, which claims the benefit of priority of U.S. Provisional Patent Application No. 63/132,345, filed Dec. 30, 2020, entitled SYSTEM AND METHOD FOR MATCHING OF BLOCK AND SLICE HISTOLOGICAL SAMPLES, which are incorporated herein by reference in their entirety.

TECHNICAL FIELD

This disclosure generally relates to an imaging system, such as for capturing images of a block and/or a slice of a histological sample.

BACKGROUND

An imaging system can be used to capture an image of a desired scene. Thereafter, the image can be used for a variety of purposes, including, for example, image analysis. For example, an imaging system can capture an image and perform image analysis on the image to determine particular image characteristics of the image. Examples of imaging systems include, but are not limited to, cameras, scanners, microscopes, mobile devices, tablets, laptops, and/or wearable electronics.

SUMMARY

One aspect of the present disclosure is an image analysis apparatus. The image analysis apparatus can include a first imaging device that is configured to scan a tissue sample block and generate block image data based on the scanning the tissue sample block. The tissue sample block may be configured to be sliced to form one or more slices of the tissue sample block. The image analysis apparatus can further include a second imaging device that is configured to scan a slice of the one or more slices of the tissue sample block and generate slice image data based on the scanning the slice. The image analysis apparatus can further include a computing device that is configured to obtain first block image data from the first imaging device and obtain first slice image data from the second imaging device. The computing device further is configured to link the first block image data and the first slice image data together. The computing device further is configured to provide the first block image data, the first slice image data, and information indicative of the first block image data and the first slice image data being correctly linked together as inputs to a machine learning algorithm. The computing device further is configured to train the machine learning algorithm using the inputs to the machine learning algorithm. The computing device further is configured to obtain second block image data from the first imaging device and second slice image data from the second imaging device, the second block image data and the second slice image data being linked together. The computing device further is configured to, based on the second block image data and the second slice image data being linked together, perform image analysis on the second block image data and the second slice image data using the machine learning algorithm. The computing device further is configured to determine, based on an output of the machine learning algorithm, a confidence value indicative of whether the second block image data and the second slice image data are correctly linked together.

In another aspect of the present disclosure, the computing device is further configured to obtain a confidence threshold associated with a user. The computing device is further configured to compare the confidence value and the confidence threshold. The computing device is further configured to, based at least in part on the comparing of the confidence value and the confidence threshold, generate a recommendation for the user indicative of whether the second block image data and the second slice image data are correctly linked together.

In another aspect of the present disclosure, the computing device is further configured to perform the image analysis using the machine learning algorithm by providing the second block image data and the second slice image data to a trained convolutional neural network. The trained convolutional neural network is configured to perform the image analysis.

In another aspect of the present disclosure, the computing device is further configured to extract a first plurality of features from the block image data. The first plurality of features include one or more of a plurality of filters or a plurality of patterns. The computing device is further configured to extract a second plurality of features from the slice image data. The second plurality of features include one or more of a plurality of filters or a plurality of patterns. Performing the image analysis using the machine learning algorithm includes comparing the first plurality of features and the second plurality of features.

In another aspect of the present disclosure, the computing device is configured to perform the image analysis by using one or more of an image differencing algorithm, a spatial analysis algorithm, a pattern recognition algorithm, a shape comparison algorithm, a color distribution algorithm, a blob detection algorithm, a template matching algorithm, a SURF feature extraction algorithm, an edge detection algorithm, a keypoint matching algorithm, a histogram comparison algorithm, or a semantic texton forest algorithm.

In another aspect of the present disclosure, the image analysis apparatus further includes a coverslipper and a stainer. The stainer stains the slice of the tissue sample block to generate a stained slice. The coverslipper generates a slide of the stained slice. The second imaging device is configured to scan the stained slice.

In another aspect of the present disclosure, the first imaging device and the second imaging device can be different imaging devices. In another aspect of the present disclosure, the first imaging device and the second imaging device can be the same imaging device.

In another aspect of the present disclosure, the tissue sample block is associated with a first identifier and the slice of the tissue sample block is associated with a second identifier. Linking the block image data and the first slice image data is based at least in part on the first identifier corresponding to the second identifier.

In another aspect of the present disclosure, the slice of the tissue sample block and the tissue sample block are each associated with at least one of a tag, an RFID tag, a Bluetooth tag, an identifier, a barcode, a label, a marker, or a stamp.

In another aspect of the present disclosure, the tissue sample block includes one or more of a paraffin embedded tissue sample block, an OCT-embedded tissue sample block, a frozen tissue sample block, or a fresh tissue sample block.

In another aspect of the present disclosure, the image analysis apparatus further includes a third imaging device. The third imaging device is configured to scan a second slice of the one or more slices of the tissue sample block to generate third slice image data. The computing device is further configured to obtain the third slice image data from the third imaging device and third block image data from the first imaging device. The computing device is further configured to link the third block image data and the third slice image data together. The computing device is further configured to provide the third block image data, the third slice image data, and information indicative of the third block image data and the third slice image data being correctly linked together as further inputs to the machine learning algorithm.

In another aspect of the present disclosure, the image analysis apparatus further includes a microtome configured to slice the tissue sample block to generate the one or more slices of the tissue sample block.

In another aspect of the present disclosure, the first imaging device is a microtome. The second imaging device includes one or more of the microtome, a cover-slipper, a case folder imaging station, a single slide imaging station, a dedicated low resolution imaging device, or a digital pathology scanner.

In another aspect of the present disclosure, the computing device is further configured to transmit the recommendation to a user computing device associated with the user.

In another aspect of the present disclosure, the computing device is further configured to cause display of the recommendation via the user computing device associated with the user.

In another aspect of the present disclosure, the computing device is further configured to obtain a response to the recommendation, the response including an acceptance of the recommendation. The computing device is further configured to adjust the confidence threshold based on the response corresponding to the acceptance of the recommendation.

In another aspect of the present disclosure, the computing device is further configured to obtain a response to the recommendation, the response including a rejection of the recommendation. The computing device is further configured to adjust the confidence threshold based on the response corresponding to the rejection of the recommendation.

In another aspect of the present disclosure, the computing device is further configured to obtain a response to the recommendation. The computing device is further configured to adjust the machine learning algorithm based on the response to the recommendation.

In another aspect of the present disclosure, the recommendation includes a similarity score.

In another aspect of the present disclosure, the confidence threshold is associated with a plurality of users. The computing device further determines the confidence threshold based on a plurality of characteristics associated with the plurality of users.

In another aspect of the present disclosure, the computing device is configured to provide the recommendation via an application programming interface.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

DETAILED DESCRIPTION

Figure 1:
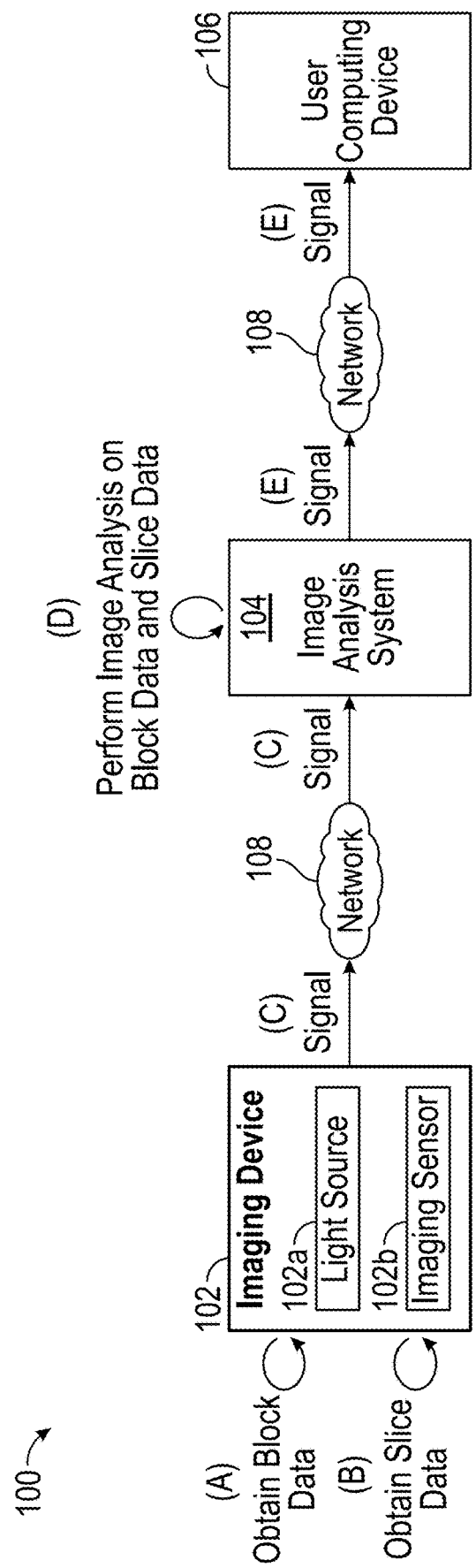
FIG. 1 depicts a schematic diagram of an example networked environment according to some embodiments.

Generally described, the present disclosure relates to an imaging system that can receive a first image of a histological sample (e.g., a tissue block) and determine a likelihood of a match between the first image of the histological sample and a second image of the histological sample (e.g., a slice of the tissue block affixed to a slide). Based on the likelihood of the match between the first image and the second image (e.g., a likelihood that the histological sample of the first image and a histological sample of the second image correspond to the same histological sample), the imaging system can perform various operations, such as generating a recommendation and providing the recommendation to a user via a user computing device.

In order to determine the likelihood of the match between the first image and the second image, the imaging system can implement an image analysis module (e.g., a convolutional neural network, a machine learning algorithm, etc.) that analyzes each image. As described herein, the use of an image analysis module within such an imaging system can increase the accuracy of the imaging process. For example, the imaging system may provide a more accurate indication of a match between the first image and the second image. By using the image analysis module, the imaging system can efficiently and accurately determine the likelihood of a match. Furthermore, use of the image analysis module can reduce the amount of erroneous matches or mismatches and can reduce the amount of matches that are provided for secondary analysis (e.g., reducing the amount of matches that are provided to a user for verification).

As used herein, the term "imaging system" may refer to any electronic device or component(s) capable of performing an imaging process. For example, an "imaging system" may comprise a scanner, a camera, etc. In some embodiments, the imaging system may not perform the imaging and, instead, may receive the image data and perform image analysis on the image data.

As described herein, an imaging system can be used to perform image analysis on received image data (e.g., image data corresponding to histological samples). The imaging system can obtain (e.g., via imaging performed by the imaging system or via imaging performed by an imaging device) image data of a first histological sample and image data of a second histological sample. Each histological sample can be associated with a particular tissue block and/or a section of a particular tissue block, and, to ensure accurate medical diagnoses, it is important to ensure that histological sample images corresponding to a particular tissue block are matched with histological sample images corresponding to the same tissue block (e.g., images that correspond to the same tissue block are linked to that tissue block).

Each histological sample can be associated with an identifier and, based on these identifiers, the imaging system can compare the images of the histological samples to verify the accuracy of the linking of the histological samples. The imaging system can implement an image analysis module in order to compare the images of the histological samples. The imaging system can feed the images of the histological samples into the image analysis module to determine the likelihood of a match between the images of the histological samples. The image analysis module may be trained on a set of predetermined training image data to identify matches. Based on this training, the image analysis module may determine a likelihood that the images of the histological samples are a match. For example, the image analysis module may determine that it is extremely unlikely that the images of the histological samples are a match. The imaging system, based on this likelihood, can generate a recommendation and provide this recommendation to a user of the imaging system.

In many conventional cases, implementing a generic imaging system to perform the imaging process may not provide satisfactory results in particular circumstances or for particular users. Such generic imaging systems may determine that images of histological samples are a match based on a user input. For example, the imaging system may receive an indication that two or more images are a match and the imaging system may be unable to verify this match. Such a generic imaging system may cause images to be erroneously matched based upon a user input. For example, due to user error, the user may erroneously match image data or erroneously determine that image data does not match. As the image data corresponds to histological samples (e.g., tissue blocks), it can be crucial to determine accurate matches of the histological samples. An erroneous match between images corresponding to different histological samples and/or a failure to identify images that correspond to the same histological sample can result in misdiagnosis. Such a misdiagnosis can lead to additional adverse consequences. Further, by requiring a user input for each pair of images, the imaging process can result in performance issues. For example, the imaging process for a generic imaging system may be slow, inefficient, and non-effective. Conventional imaging systems may therefore be inadequate in the aforementioned situations.

As imaging systems proliferate, the demand for faster and more efficient image processing and image analysis has also increased. The present disclosure provides a system for analyzing image data with significant advantages over prior implementations. The present disclosure provides systems and methods that enable an increase in the accuracy of an identification of a match between image data, relative to traditional imaging systems, without significantly affecting speed or efficiency. These advantages are provided by the embodiments discussed herein, and specifically by the implementation of an image analysis module to analyze the image data and determine the likelihood of a match between image data. Further, the use of sample identifiers allows for the verification of a determination by the convolution neural network that given images are a match or are not a match. The use of the image analysis module may further allow the imaging system to determine matches between images based on prior determined matches between images, thereby increasing the accuracy and efficiency of the imaging processing according to the above methods.

Some aspects of this disclosure relate to training and using an image analysis module configured to receive image data of one or more histological samples for determining a likelihood that the image data corresponds to additional image data. The image analysis module described herein can provide improved accuracy for image analysis by using a trained module (e.g., a machine learning model, a convolutional neural network) that is trained to recognize similarities between image data. An image analysis module that uses such a trained module is able to provide increased precision and recall without significantly impacting computation speeds provided by conventional image analysis systems. In some embodiments, the image analysis may be based on additional data. For example, the image analysis may be based at least in part on identifiers associated with the image data. The identifiers may include tags, identifiers, or other indicators corresponding to particular image data.

The identifiers can provide identifying information for particular image data. For example, the identifiers can identify a source of the histological sample, a patient associated with the histological sample, a unique code, or any other identifying information. Based on the identifiers, the image analysis system can determine that first image data (e.g., an image associated with a tissue block) should be compared with second image data (e.g., an image associated with a slide of tissue). For example, the image analysis system can determine that if the first image data and the second image data share the same identifier, the first image data and the second image data should be compared. The identifiers may indicate a user identified match between image data and the image analysis system can determine a likelihood that this indication is accurate. In some embodiments, the image analysis system may not use identifiers to identify possible matches. Instead, the image analysis system may compare first image data with a plurality of image data stored by the image analysis system. The image analysis system may further use the identifiers to weight matches or mismatches identified by the image analysis system.

As described herein, the image analysis module may include any machine learning model (e.g., a computing system, a computing device, etc.) and/or any convolutional neural network. Further, the image analysis module can implement one or more image analysis algorithms which may include, for example, an image differencing algorithm, a spatial analysis algorithm, a pattern recognition algorithm, a shape comparison algorithm, a color distribution algorithm, a blob detection algorithm, a template matching algorithm, a SURF feature extraction algorithm, an edge detection algorithm, a keypoint matching algorithm, a histogram comparison algorithm, a semantic texton forest algorithm, and/or any other type of image analysis algorithm. The image analysis module may implement one or more of the algorithms in order to analyze the image data.

As described herein, the image analysis system, based on the image analysis performed by the image analysis module, can determine an output indicating the likelihood of a match between first image data and second image data. For example, the image analysis system can determine that it is substantially likely that the first image data and the second image data correspond to the same histological sample. Further, based on the output, the image analysis system can determine a confidence value that the first image data and the second image data correspond to the same histological sample. For example, if the output indicates that the first image data and the second image data are likely not a match, the image analysis system can provide a low confidence value that the first image data and the second image data are a match. Further, if the output indicates the first image data and the second image data are likely a match, the image analysis system can provide a higher confidence value that the first image data and the second image data are a match. The confidence value may correspond to a rating with regards to a confidence scale. For example, the confidence value may be an alphabetical, numerical, alphanumerical, or symbolical rating (e.g., the confidence value may be 70%, indicating a 70% confidence in a match of the image data).

As described herein, the image analysis system can determine a confidence threshold for a particular user associated with the image analysis system. For example, the user may be a user requesting the analysis of the image data. Further, the user may provide a confidence threshold that indicates a desired confidence value for a match. For example, the confidence threshold may indicate that a confidence value over 70% can be identified as a match and a confidence value at 70% or below should be verified by the user. The image analysis system can further compare the confidence value corresponding to the comparison of image data with the confidence threshold. Based on the comparison of the confidence value and the confidence threshold, the image analysis system can determine a recommendation and provide the recommendation to the user. It is noted that a confidence threshold level of about 70% is for illustrative purposes, and that the confidence threshold level can be lower or higher depending on the particular application, patient data, user preferences, etc.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

System Overview

FIG. 1 illustrates an example environment 100 in which a user and/or a system may implement an image analysis system 104 according to some embodiments. The image analysis system 104 may perform image analysis on received image data. The image analysis system 104 can perform image analysis in order to determine a likelihood that first image data of the received image data matches second image data of the received image data, or that the first image data and the second image data are correctly linked or otherwise associated with each other (e.g., the first image data and the second image data correspond to the same tissue sample block, the first image data and the second image data correspond to the same patient, etc.). Based on the determined likelihood, the image analysis system 104 can generate a recommendation.

The image analysis system 104 may perform the image analysis using an image analysis module (not shown in FIG. 1). The image analysis system 104 may receive the image data from an imaging device 102 and transmit the recommendation to a user computing device 106 for processing. Although some examples herein refer to a specific type of device as being the imaging device 102, the image analysis system 104, or the user computing device 106, the examples are illustrative only and are not intended to be limiting, required, or exhaustive. The image analysis system 104 may be any type of computing device (e.g., a server, a node, a router, a network host, etc.). Further, the imaging device 102 may be any type of imaging device (e.g., a camera, a scanner, a mobile device, a laptop, etc.). In some embodiments, the imaging device 102 may include a plurality of imaging devices. Further, the user computing device 106 may be any type of computing device (e.g., a mobile device, a laptop, etc.).

The imaging device 102 may capture and/or generate image data for analysis. The imaging device 102 may include one or more of a lens, an image sensor, a processor, or memory. The imaging device 102 may receive a user interaction. The user interaction may be a request to capture image data. Based on the user interaction, the imaging device 102 may capture image data. In some embodiments, the imaging device 102 may capture image data periodically (e.g., every 10, 20, or 30 minutes). In other embodiments, the imaging device 102 may determine that an item has been placed in view of the imaging device 102 (e.g., a histological sample has been placed on a table and/or platform associated with the imaging device 102) and, based on this determination, capture image data corresponding to the item. The imaging device 102 may further receive image data from additional imaging devices. For example, the imaging device 102 may be a node that routes image data from other imaging devices to the image analysis system 104. In some embodiments, the imaging device 102 may be located within the image analysis system 104. For example, the imaging device 102 may be a component of the image analysis system 104. Further, the image analysis system 104 may perform an imaging function. In other embodiments, the imaging device 102 and the image analysis system 104 may be connected (e.g., wirelessly or wired connection). For example, the imaging device 102 and the image analysis system 104 may communicate over a network 108. Further, the imaging device 102 and the image analysis system 104 may communicate over a wired connection. In one embodiment, the image analysis system 104 may include a docking station that enables the imaging device 102 to dock with the image analysis system 104. An electrical contact of the image analysis system 104 may connect with an electrical contact of the imaging device 102. The image analysis system 104 may be configured to determine when the imaging device 102 has been connected with the image analysis system 104 based at least in part on the electrical contacts of the image analysis system 104. In some embodiments, the image analysis system 104 may use one or more other sensors (e.g., a proximity sensor) to determine that an imaging device 102 has been connected to the image analysis system 104. In some embodiments, the image analysis system 104 may be connected to (via a wired or a wireless connection) a plurality of imaging devices.

The image analysis system 104 may include various components for providing the features described herein. In some embodiments, the image analysis system 104 may include one or more image analysis modules to perform the image analysis of the image data received from the imaging device 102. The image analysis modules may perform one or more imaging algorithms using the image data.

The image analysis system 104 may be connected to the user computing device 106. The image analysis system 104 may be connected (via a wireless or wired connection) to the user computing device 106 to provide a recommendation for a set of image data. The image analysis system 104 may transmit the recommendation to the user computing device 106 via the network 108. In some embodiments, the image analysis system 104 and the user computing device 106 may be configured for connection such that the user computing device 106 can engage and disengage with image analysis system 104 in order to receive the recommendation. For example, the user computing device 106 may engage with the image analysis system 104 upon determining that the image analysis system 104 has generated a recommendation for the user computing device 106. Further, a particular user computing device 106 may connect to the image analysis system 104 based on the image analysis system 104 performing image analysis on image data that corresponds to the particular user computing device 106. For example, a user may be associated with a plurality of histological samples. Upon determining, that a particular histological sample is associated with a particular user and a corresponding user computing device 106, the image analysis system 104 can transmit a recommendation for the histological sample to the particular user computing device 106. In some embodiments, the user computing device 106 may dock with the image analysis system 104 in order to receive the recommendation.

In some implementations, the imaging device 102, the image analysis system 104, and/or the user computing device 106 may be in wireless communication. For example, the imaging device 102, the image analysis system 104, and/or the user computing device 106 may communicate over a network 108. The network 108 may include any viable communication technology, such as wired and/or wireless modalities and/or technologies. The network may include any combination of Personal Area Networks ("PANs"), Local Area Networks ("LANs"), Campus Area Networks ("CANs"), Metropolitan Area Networks ("MANs"), extranets, intranets, the Internet, short-range wireless communication networks (e.g., ZigBee, Bluetooth, etc.), Wide Area Networks ("WANs")—both centralized and/or distributed—and/or any combination, permutation, and/or aggregation thereof. The network 108 may include, and/or may or may not have access to and/or from, the internet. The imaging device 102 and the image analysis system 104 may communicate image data. For example, the imaging device 102 may communicate image data associated with a histological sample to the image analysis system 104 via the network 108 for analysis. The image analysis system 104 and the user computing device 106 may communicate a recommendation corresponding to the image data. For example, the image analysis system 104 may communicate a recommendation indicating a likelihood that first image data matches second image data to the user computing device 106. In some embodiments, the imaging device 102 and the image analysis system 104 may communicate via a first network and the image analysis system 104 and the user computing device 106 may communicate via a second network. In other embodiments, the imaging device 102, the image analysis system 104, and the user computing device 106 may communicate over the same network.

With reference to an illustrative embodiment, at [A], the imaging device 102 can obtain block data. In order to obtain the block data, the imaging device 102 can image (e.g., scan, capture, record, etc.) a tissue block. The tissue block may be a histological sample. For example, the tissue block may be a block of biological tissue that has been removed and prepared for analysis. As will be discussed in further below, in order to prepare the tissue block for analysis, various histological techniques may be performed on the tissue block. The imaging device 102 can capture an image of the tissue block and store corresponding block data in the imaging device 102. The imaging device 102 may obtain the block data based on a user interaction. For example, a user may provide an input through a user interface (e.g., a graphical user interface ("GUI")) and request that the imaging device 102 image the tissue block. Further, the user can interact with imaging device 102 to cause the imaging device 102 to image the tissue block. For example, the user can toggle a switch of the imaging device 102, push a button of the imaging device 102, provide a voice command to the imaging device 102, or otherwise interact with the imaging device 102 to cause the imaging device 102 to image the tissue block. In some embodiments, the imaging device 102 may image the tissue block based on detecting, by the imaging device 102, that a tissue block has been placed in a viewport of the imaging device 102. For example, the imaging device 102 may determine that a tissue block has been placed on a viewport of the imaging device 102 and, based on this determination, image the tissue block.

At [B], the imaging device 102 can obtain slice data. In some embodiments, the imaging device 102 can obtain the slice data and the block data. In other embodiments, a first imaging device can obtain a slide including the slice and a second imaging device can obtain the block data. In order to obtain the slice data, the imaging device 102 can image (e.g., scan, capture, record, etc.) a slide of the slice of the tissue block. The slice of the tissue block may be affixed to the slide. In some embodiments, the imaging device 102 can image the slice of the tissue block directly. The slice of the tissue block may be a slice of the histological sample. For example, the tissue block may be sliced (e.g., sectioned) in order to generate one or more slices of the tissue block. In some embodiments, a portion of the tissue block may be sliced to generate a slice of the tissue block such that a first portion of the tissue block corresponds to the tissue block imaged to obtain the block data and a second portion of the tissue block corresponds to the slice of the tissue block imaged to obtain the slice data. As will be discussed in further detail below, various histological techniques may be performed on the tissue block in order to generate the slice of the tissue block and affix the slice to a slide. The imaging device 102 can capture an image of the slide and store corresponding slice data in the imaging device 102. The imaging device 102 may obtain the slice data based on a user interaction. For example, a user may provide an input through a user interface and request that the imaging device 102 image the slide. Further, the user can interact with imaging device 102 to cause the imaging device 102 to image the slide. In some embodiments, the imaging device 102 may image the tissue block based on detecting, by the imaging device 102, that the tissue block has been sliced or that a slide has been placed in a viewport of the imaging device 102.

At [C], the imaging device 102 can transmit a signal to the image analysis system 104 representing the captured image data (e.g., the block data and the slice data). The imaging device 102 can send the captured image data as an electronic signal to the image analysis system 104 via the network 108. The signal may include and/or correspond to a pixel representation of the block data and/or the slice data. It will be understood that the signal can include and/or correspond to more, less, or different image data. For example, the signal may correspond to multiple slices of a tissue block and may represent a first slice data and a second slice data. Further, the signal may enable the image analysis system 104 to reconstruct the block data and/or the slice data. In some embodiments, the imaging device 102 can transmit a first signal corresponding to the block data and a second signal corresponding to the slice data. In other embodiments, a first imaging device can transmit a signal corresponding to the block data and a second imaging device can transmit a signal corresponding to the slice data.

At [D], the image analysis system 104 can perform image analysis on the block data and the slice data provided by the imaging device 102. In order to perform the image analysis, the image analysis system 104 may utilize one or more image analysis modules that can perform one or more image processing functions. For example, the image analysis module may include an imaging algorithm, a machine learning model, a convolutional neural network, or any other modules for performing the image processing functions. Based on performing the image processing functions, the image analysis module can determine a likelihood that the block data and the slice data correspond to the same tissue block. For example, an image processing functions may include an edge analysis of the block data and the slice data and based on the edge analysis, determine whether the block data and the slice data correspond to the same tissue block. The image analysis system 104 can obtain a confidence threshold from the user computing device 106, the imaging device 102, or any other device. In some embodiments, the image analysis system 104 can determine the confidence threshold based on a response by the user computing device 106 to a particular recommendation. Further, the confidence threshold may be specific to a user, a group of users, a type of tissue block, a location of the tissue block, or any other factor. The image analysis system 104 can compare the determined confidence threshold with the image analysis performed by the image analysis module. Based on this comparison, the image analysis system 104 can generate a recommendation indicating a recommended action for the user computing device 106 based on the likelihood that the block data and the slice data correspond to the same tissue block.

At [E], the image analysis system 104 can transmit a signal to the user computing device 106 representing a recommendation indicating the likelihood that the block data and the slice data correspond to the same tissue block. The image analysis system 104 can send the recommendation as an electrical signal to the user computing device 106 via the network 108. The signal may include and/or correspond to a representation of the recommendation. Based on receiving the signal, the user computing device 106 can determine the recommendation. In some embodiments, the image analysis system 104 may transmit a series of recommendations corresponding to a group of tissues blocks, slides, and/or slices. The image analysis system 104 can include, in the recommendation, a recommended action of a user. For example, the recommendation may include a recommendation for the user to review the tissue block and the slice affixed to the slide. Further, the recommendation may include a recommendation that the user does not need to review the tissue block and the slice affixed to the slide. The recommendation may further include a representation of the strength of the recommendation. For example, the recommendation may include a qualifier such as a percentage, a ranking, a phrase (e.g., uncertain, likely, unlikely, etc.), etc. that indicates the strength of the recommendation.

Imaging Prepared Blocks and Prepared Slides

Figure 2:
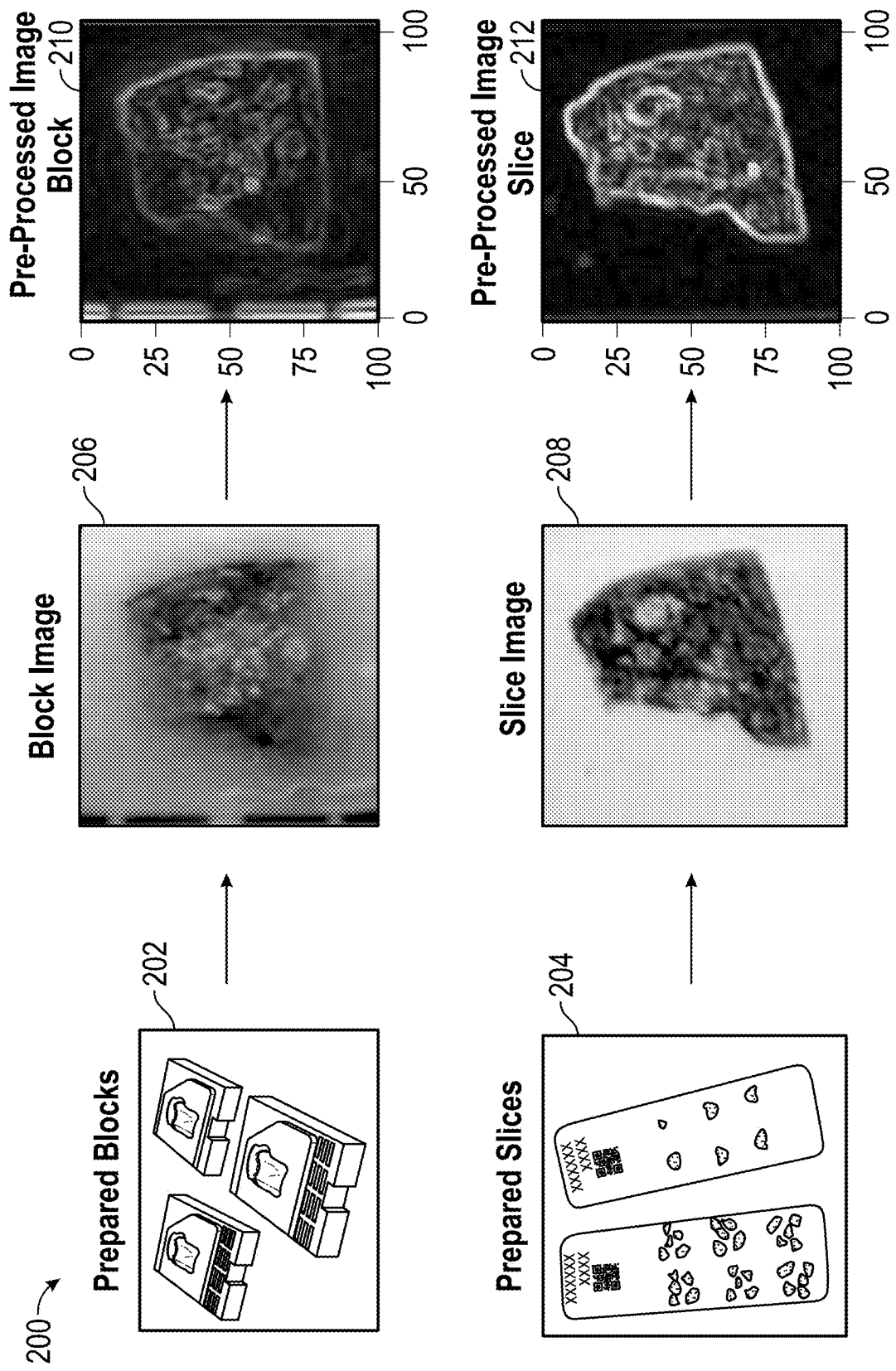
FIG. 2 depicts an example workflow for generating image data from a tissue sample block according to some embodiments.

FIG. 2 depicts an example workflow 200 for generating image data from a tissue sample block according to some embodiments. The example workflow 200 illustrates a process for generating prepared blocks and prepared slides including slices from a tissue block and generating preprocessed images based on the prepared blocks and the prepared slides. The example workflow 200 may be implemented by one or more computing devices. For example, the example workflow 200 may be implemented by a microtome, a coverslipper, a stainer, and an imaging device. Each computing device may perform a portion of the example workflow. For example, the microtome may cut the tissue block in order to generate one or more slices of the tissue block. The coverslipper may create a first slide for the tissue block and/or a second slide for a slice of the tissue block, the stainer may stain each slide, and the imaging device may image each slide.

A tissue block can be obtained from a patient (e.g., a human, an animal, etc.). The tissue block may correspond to a section of tissue from the patient. The tissue block may be surgically removed from the patient for further analysis. For example, the tissue block may be removed in order to determine if the tissue block has certain characteristics (e.g., if the tissue block is cancerous). In order to generate the prepared blocks 202, the tissue block may be prepared using a particular preparation process by a tissue preparer. For example, the tissue block may be preserved and subsequently embedded in a paraffin wax block. Further, the tissue block may be embedded (in a frozen state or a fresh state) in a block. The tissue block may also be embedded using an optimal cutting temperature ("OCT") compound. The preparation process may include one or more of a paraffin embedding, an OCT-embedding, or any other embedding of the tissue block. In the example of FIG. 2, the tissue block is embedded using paraffin embedding. Further, the tissue block is embedded within a paraffin wax block and mounted on a microscopic slide in order to formulate the prepared block.

The microtome can obtain a slice of the tissue block in order to generate the prepared slides 204. The microtome can use one or more blades to slice the tissue block and generate a slice (e.g., a section) of the tissue block. The microtome can further slice the tissue block to generate a slice with a preferred level of thickness. For example, the slice of the tissue block may be 1 millimeter. The microtome can provide the slice of the tissue block to a coverslipper. The coverslipper can encase the slice of the tissue block in a slide to generate the prepared slides 204. The prepared slides 204 may include the slice mounted in a certain position. Further, in generating the prepared slides 204, a stainer may also stain the slice of the tissue block using any staining protocol. Further, the stainer may stain the slice of the tissue block in order to highlight certain portions of the prepared slides 204 (e.g., an area of interest). In some embodiments, a computing device may include both the coverslipper and the stainer and the slide may be stained as part of the process of generating the slide.

The prepared blocks 202 and the prepared slides 204 may be provided to an imaging device for imaging. In some embodiments, the prepared blocks 202 and the prepared slides 204 may be provided to the same imaging device. In other embodiments, the prepared blocks 202 and the prepared slides 204 are provided to different imaging devices. The imaging device can perform one or more imaging operations on the prepared blocks 202 and the prepared slides 204. In some embodiments, a computing device may include one or more of the tissue preparer, the microtome, the coverslipper, the stainer, and/or the imaging device.

The imaging device can capture an image of the prepared block 202 in order to generate the block image 206. The block image 206 may be a representation of the prepared block 202. For example, the block image 206 may be a representation of the prepared block 202 from one direction (e.g., from above). The representation of the prepared block 202 may correspond to the same direction as the prepared slides 204 and/or the slice of the tissue block. For example, if the tissue block is sliced in a cross-sectional manner in order to generate the slice of the tissue block, the block image 206 may correspond to the same cross-sectional view. In order to generate the block image 206, the prepared block 202 may be placed in a cradle of the imaging device and imaged by the imaging device. Further, the block image 206 may include certain characteristics. For example, the block image 206 may be a color image with a particular resolution level, clarity level, zoom level, or any other image characteristics.

The imaging device can capture an image of the prepared slides 204 in order to generate the slide image 208. The imaging device can capture an image of a particular slice of the prepared slides 204. For example, a slide may include any number of slices and the imaging device may capture an image of a particular slice of the slices. The slide image 208 may be a representation of the prepared slides 204. The slide image 208 may correspond to a view of the slice according to how the slice of the tissue block was generated. For example, if the slice of the tissue block was generated via a cross-sectional cut of the tissue block, the slide image 208 may correspond to the same cross-sectional view. In order to generate the slide image 208, the prepared slides 204 may be placed in a cradle of the imaging device (e.g., in a viewer of a microscope) and imaged by the imaging device. Further, the slide image 208 may include certain characteristics. For example, the slide image 208 may be a color image with a particular resolution level, clarity level, zoom level, or any other image characteristics.

The imaging device can process the block image 206 in order to generate a pre-processed image 210 and the slide image 208 in order to generate the pre-processed image 212. The imaging device can perform one or more image operations on the block image 206 and the slide image 208 in order to generate the pre-processed image 210 and the pre-processed image 212. The one or more image operations may include isolating (e.g., focusing on) various features of the pre-processed image 210 and the pre-processed imaged 212. For example, the one or more image operations may include isolating the edges of a slice or a tissue block, isolating areas of interest within a slice or a tissue block, or otherwise modifying (e.g., transforming) the block image 206 and/or the slide image 208. In some embodiments, the imaging device can perform the one or more image operations on one of the block image 206 or the slide image 208. For example, the imaging may perform the one or more image operations on the block image 206. In other embodiments, the imaging device can perform first image operations on the block image 206 and second image operations on the slide image 208. The imaging device may provide the pre-processed image 210 and the pre-processed image 212 to the image analysis system to determine a likelihood that the pre-processed image 210 and the pre-processed image 212 correspond to the same tissue block.

Slicing a Tissue Block

Figure 3A:
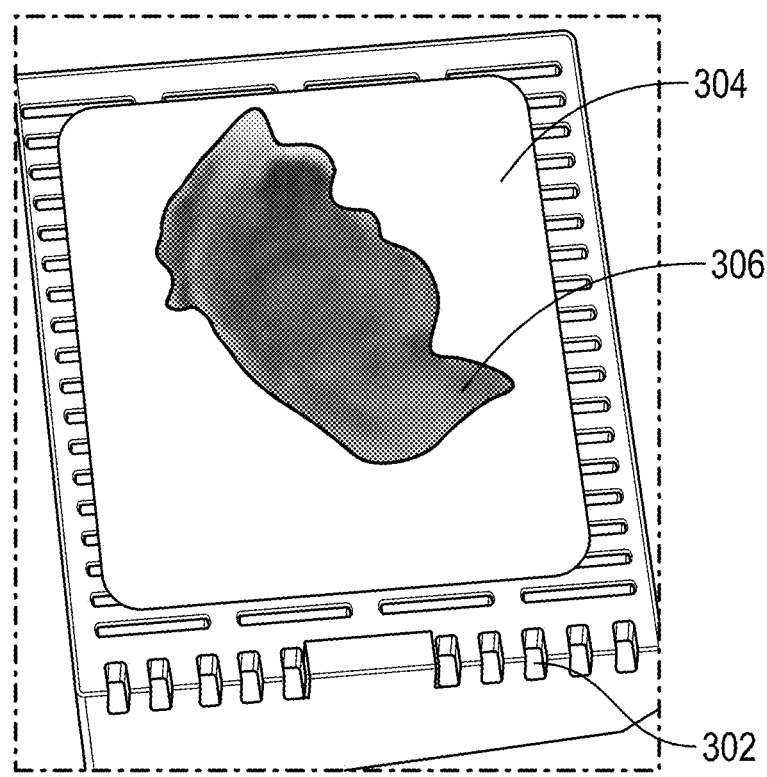
FIG. 3A illustrates an example tissue block sample according to some embodiments.

FIG. 3A illustrates an example prepared tissue block 300A according to some embodiments. The prepared tissue block 300A may include a tissue block 306 that is preserved (e.g., chemically preserved, fixed, supported) in a particular manner. In order to generate the prepared tissue block 300A, the tissue block 306 can be placed in a fixing agent (e.g., a liquid fixing agent). For example, the tissue block 306 can be placed in a fixative such as formaldehyde solution. The fixing agent can penetrate the tissue block 306 and preserve the tissue block 306. The tissue block 306 can subsequently be isolated in order to enable further preservation of the tissue block 306. Further, the tissue block 306 can be immersed in one or more solutions (e.g., ethanol solutions) in order to replace water within the tissue block 306 with the one or more solutions. The tissue block 306 can be immersed in one or more intermediate solutions. Further, the tissue block 306 can be immersed in a final solution (e.g., a histological wax). For example, the histological wax may be a purified paraffin wax. After being immersed in a final solution, the tissue block 306 may be formed into a prepared tissue block 300A. For example, the tissue block 306 may be placed into a mould filled with the histological wax. By placing the tissue block in the mould, the tissue block 306 may be moulded (e.g., encased) in the final solution 304. In order to generate the prepared tissue block 300A, the tissue block 306 in the final solution 304 may be placed on a platform 302. Therefore, the prepared tissue block 300A may be generated. It will be understood that the prepared tissue block 300A may be prepared according to any tissue preparation methods.

Figure 3B:
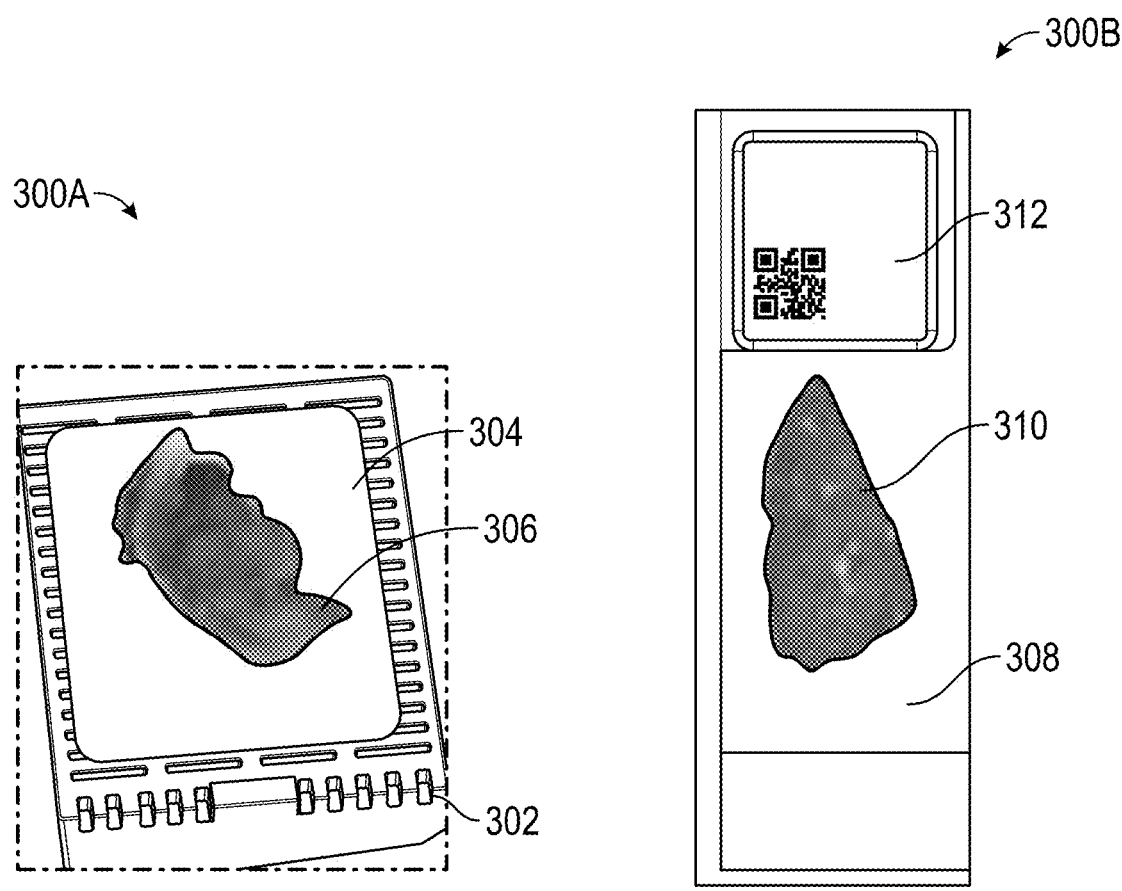
FIG. 3B illustrates an example tissue block sample and an example tissue slice sample affixed to a slide according to some embodiments.

FIG. 3B illustrates an example prepared tissue block 300A and an example prepared slide 300B with an affixed tissue slice according to some embodiments. The prepared tissue block 300A may include the tissue block 306 encased in a final solution 304 and placed on a platform 302. In order to generate the prepared slide 300B, the prepared tissue block 300A may be sliced by a microtome. The microtome may include one or more blades to slice the prepared tissue block 300A. The microtome may take a cross-sectional slice 310 of the prepared tissue block 300A using the one or more blades. The cross-sectional slice 310 of the prepared tissue block 300A may include a slice 310 (e.g., a section) of the tissue block 306 encased in a slice of the final solution 304. In order to preserve the slice 310 of the tissue block 306, the slice 310 of the tissue block 306 may be modified (e.g., washed) to remove the final solution 304 from the slice 310 of the tissue block 306. For example, the final solution 304 may be rinsed and/or isolated from the slice 310 of the tissue block 306. Further, the slice 310 of the tissue block 306 may be stained by a stainer. In some embodiments, the slice 310 of the tissue block 306 may not be stained. The slice 310 of the tissue block 306 may subsequently be encased in a slide 308 by a coverslipper to generate the prepared slide 300B. The prepared slide 300B may include an identifier 312 identifying the tissue block 306 that corresponds to the prepared slide 300B. Not shown in FIG. 3B, the prepared tissue block 300A may also include an identifier that identifies the tissue block 306 that corresponds to the prepared tissue block 300A. As the prepared tissue block 300A and the prepared slide 300B correspond to the same tissue block 306, the identifier of the prepared tissue block 300A and the identifier 312 of the prepared slide 300B may identify the same tissue block 306.

Imaging Devices

Figure 4:
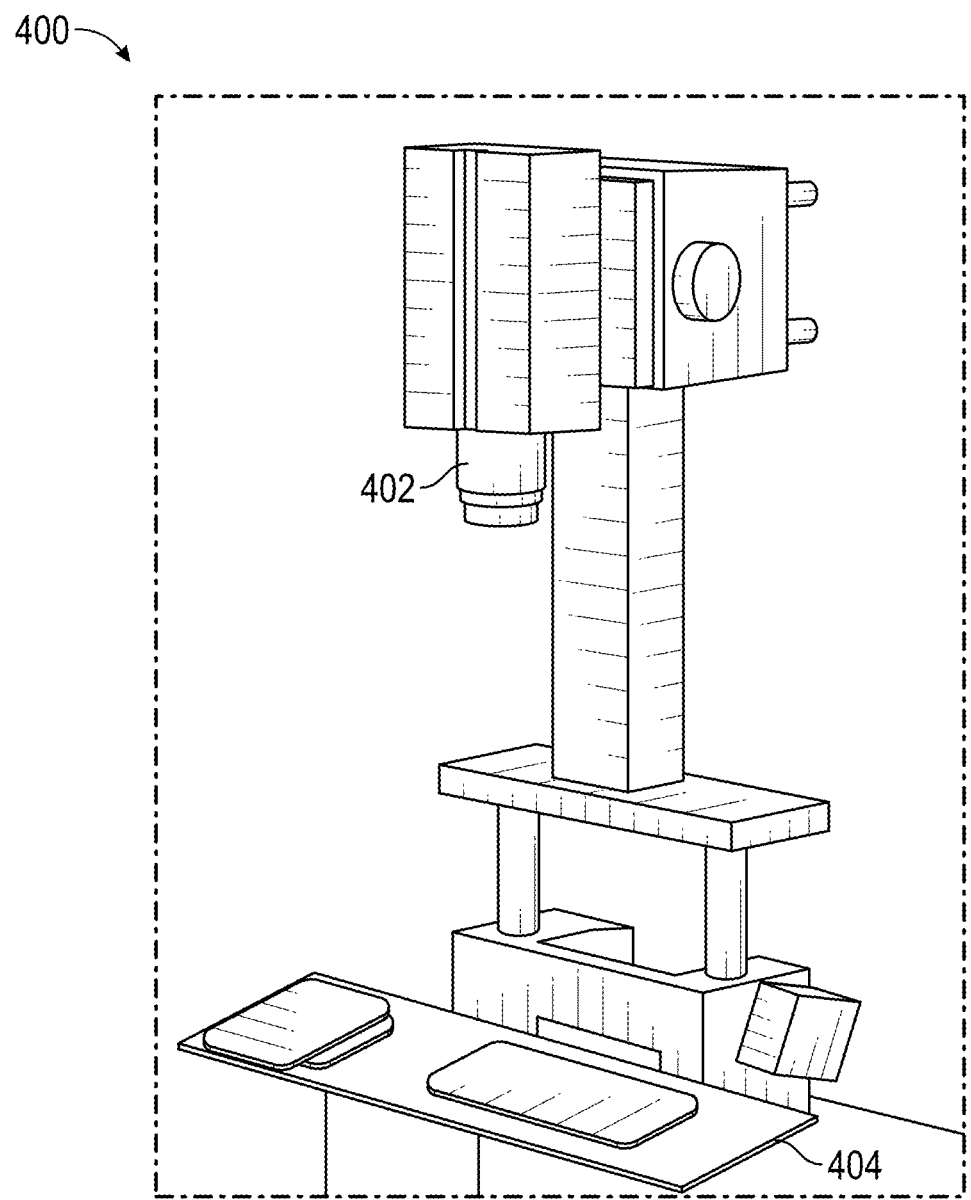
FIG. 4 depicts an imaging system for capturing images of the histological samples according to some embodiments.

FIG. 4 shows an example imaging device 400, according to one embodiment. The imaging device 400 can include an imaging apparatus 402 (e.g., a lens and an image sensor) and a platform 404. The imaging device 400 can receive a prepared tissue block and/or a prepared tissue slide with an affixed tissue slice via the platform 404. Further, the imaging device can use the imaging apparatus 402 to capture image data corresponding to the prepared block and/or the prepared slide. The imaging device 400 can be one or more of a camera, a scanner, a medical imaging device, etc. Further, the imaging device 400 can use imaging technologies such as microscopy imaging technologies. For example, the imaging technologies may include brightfield microscopy, darkfield microscopy, phase contrast microscopy, differential interference contrast microscopy, fluorescence microscopy, polarizing microscopy, kohler illumination, oil immersion microscopy, light microscopy, immunofluorescence microscopy, chromogenic in situ hybridization microscopy, in situ hybridization microscopy, fluorescence in situ hybridization microscopy, or any other type of imaging technology. For example, the imaging device can be a darkfield microscope, a brightfield microscope, a fluorescent microscope, etc.

The imaging device 400 may receive one or more of the prepared tissue block and/or the prepared slide and capture corresponding image data. In some embodiments, the imaging device 400 may capture image data corresponding to a plurality of prepared tissue slides and/or a plurality of prepared tissue blocks. The imaging device 400 may further capture, through the lens of the imaging apparatus 402, using the image sensor of the imaging apparatus 402, a representation of a prepared tissue slide and/or a prepared tissue block as placed on the platform. Therefore, the imaging device 400 can capture image data in order for the image analysis system to compare the image data to determine if the image data corresponds to the same tissue block.

Imaging Algorithms

Figure 5:
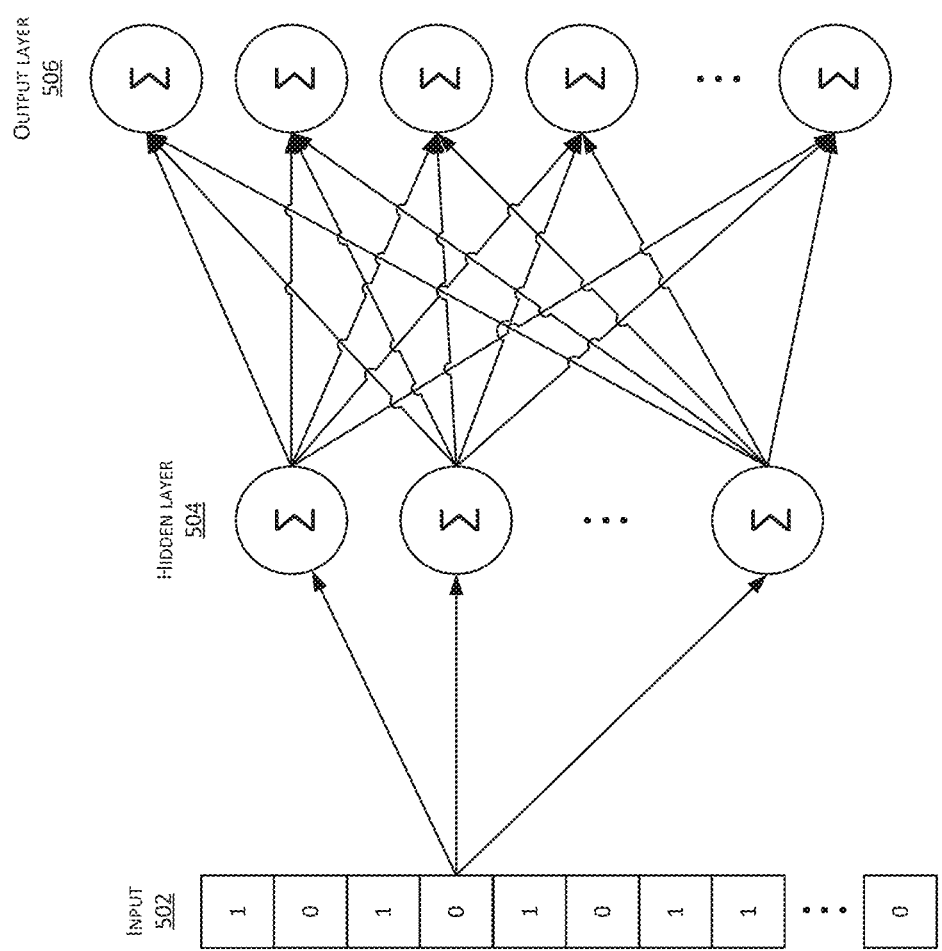
FIG. 5 depicts a schematic diagram of an image analysis module, including multiple layers of the neural network in accordance with aspects of the present disclosure.

FIG. 5 depicts a schematic diagram of an image analysis module 500, including multiple layers of a neural network in accordance with aspects of the present disclosure. The image analysis module 500 may be or may be implemented by the image analysis system. The image analysis module can implement one or more imaging algorithms in order to compare the image data to determine if the image data corresponds to the same tissue block. Further, the image analysis module 500 may correspond to one or more of a machine learning model, a convolutional neural network, etc. In the example of FIG. 4, the image analysis module 500 corresponds to a convolutional neural network.

The convolutional neural network can include an input layer 502. The input layer 502 may be an array of pixel values. For example, the input layer may include a 320×320×3 array of pixel values. Each value of the input layer 502 may correspond to a particular pixel value. Further, the input layer 502 may obtain the pixel values corresponding to the image. Each input of the input layer 502 may be transformed according to one or more calculations Further, the values of the input layer 502 may be provided to a hidden layer 504 of the convolutional neural network. In some embodiments, the convolutional neural network may include one or more hidden layers. The hidden layer can include a plurality of neurons that each perform a corresponding function. Further, the hidden layer 504 can perform one or more additional operations on the values of the input layer 502. For example, each neuron of the hidden layer 504 can calculate the weighted sum of inputs (e.g., one or more inputs of the input layer 502 may be added and weighted). By performing the one or more operations, a particular hidden layer 504 may be configured to produce a particular output. For example, a particular hidden layer 504 may be configured to identify an edge of a tissue sample and/or a block sample. Further, a particular hidden layer 504 may be configured to identify an edge of a tissue sample and/or a block sample and another hidden layer 504 may be configured to identify another feature of the tissue sample and/or a block sample. Therefore, the use of multiple hidden layers can enable the identification of multiple features of the tissue sample and/or the block sample. By identifying the multiple features, the convolutional neural network can provide a more accurate identification of a particular image. Further, the combination of the multiple hidden layers can enable the convolutional neural network to identify and differentiate particular tissue blocks and/or tissue slices.

The outputs of the one or more hidden layers 504 may be provided to an output layer 506 in order to identify (e.g., predict) a tissue block associated with the image. The convolutional neural network can further identify a likelihood that the provided image is associated with a particular tissue block. Further, when a first image data and a second image data are provided to the convolutional neural network, the convolutional neural network can determine the likelihood that the first image data and the second image data correspond to the same tissue block. In some embodiments, the convolutional neural network may include a pooling layer and/or a fully connected layer.

In order to identify the tissue block associated with a particular image, the image analysis module 500 may be trained to identify the tissue block. By such training, the trained image analysis module 500 is trained to recognize differences in images and/or similarities in images. Advantageously, the trained image analysis module 500 is able to produce an indication of a likelihood that particular sets of image data correspond to the same scene (e.g., the same tissue block).

Block training data associated with a tissue block may be provided to or otherwise accessed by the image analysis module 500 (e.g., from a scanner, from a data store, from a database, from memory, etc.) for training. The predetermined block training data may include tissue block data that has previously been identified (e.g., verified to correspond to a particular tissue block). Further, slice training data associated with the same training block may be provided to or otherwise accessed by the image analysis module 500 (e.g., from a scanner, from a data store, from a database, from memory, etc.) for training. The predetermined slice training data may include tissue slices that previously been identified (e.g., verified to correspond to the same tissue block). The predetermined slice training data and the predetermined block training data may be linked (e.g., in a data store, in memory, etc.).

Based on the block training data and the slice training data, the image analysis module 500 generates a tissue block training data set for training. Further, the image analysis module 500 trains using the tissue block training data set. The image analysis module 500 may be trained to identify a level of similarity between first image data and second image data. The image analysis module 500 may generate an output that includes a representation (e.g., an alphabetical, numerical, alphanumerical, or symbolical representation) of the similarity between the first image data and the second image data.

In some embodiments, training the image analysis module 500 may include training a machine learning model, such as a neural network, to determine relationships between different image data. The resulting trained machine learning model may include a set of weights or other parameters, and different subsets of the weights may correspond to different input vectors. For example, the weights may be encoded representations of the pixels of the images. Further, the image analysis system can provide the trained image analysis module 500 for image processing. In some embodiments, the process may be repeated where a different image analysis module 500 is generated and trained for a different data domain, a different user, etc. For example, a separate image analysis module 500 may be trained for each data domain of a plurality of data domains within which the image analysis system is configured to operate.

Illustratively, the image analysis system may include and implement one or more imaging algorithms. For example, the one or more imaging algorithms may include one or more of an image differencing algorithm, a spatial analysis algorithm, a pattern recognition algorithm, a shape comparison algorithm, a color distribution algorithm, a blob detection algorithm, a template matching algorithm, a SURF feature extraction algorithm, an edge detection algorithm, a keypoint matching algorithm, a histogram comparison algorithm, or a semantic texton forest algorithm. The image differencing algorithm can identify one or more differences between first image data and second image data. The image differencing algorithm can identify differences between the first image data and the second image data by identifying differences between each pixel of each image. The spatial analysis algorithm can identify one or more topological or spatial differences between the first image data and the second image data. The spatial analysis algorithm can identify the topological or spatial differences by identifying differences in the spatial features associated with the first image data and the second image data. The pattern recognition algorithm can identify differences in patterns of the first image data and the second image data. The pattern recognition algorithm can identify differences in patterns of the first image data and patterns of the second image data. The shape comparison algorithm can analyze one or more shapes of the first image data and one or more shapes of the second image data and determine if the shapes match. The shape comparison algorithm can further identify differences in the shapes.

The color distribution algorithm may identify differences in the distribution of colors over the first image data and the second image data. The blob detection algorithm may identify regions in the first image data that differ in image properties (e.g., brightness, color) from a corresponding region in the second image data. The template matching algorithm may identify the parts of second image data that match a template (e.g., first image data). The SURF feature extraction algorithm may extract features from the first image data and the second image data and compare the features. The features may be extracted based at least in part on particular significance of the features. The edge detection algorithm may identify the boundaries of objects within the first image data and the second image data. The boundaries of the objects within the first image data may be compared with the boundaries of the objects within the second image data. The keypoint matching algorithm may extract particular keypoints from the first image data and the second image data and compare the keypoints to identify differences. The histogram comparison algorithm may identify differences in a color histogram associated with the first image data and a color histogram associated with the second image data. The semantic texton forests algorithm may compare semantic representations of the first image data and the second image data in order to identify differences. It will be understood that the image analysis system may implement more, less, or different imaging algorithms. Further, the image analysis system may implement any imaging algorithm in order to identify differences between the first image data and the second image data. Based on the identified differences, the image analysis system can determine a likelihood that the first image data and the second image data are a match (e.g., correspond to the same tissue block).

Figure 6:
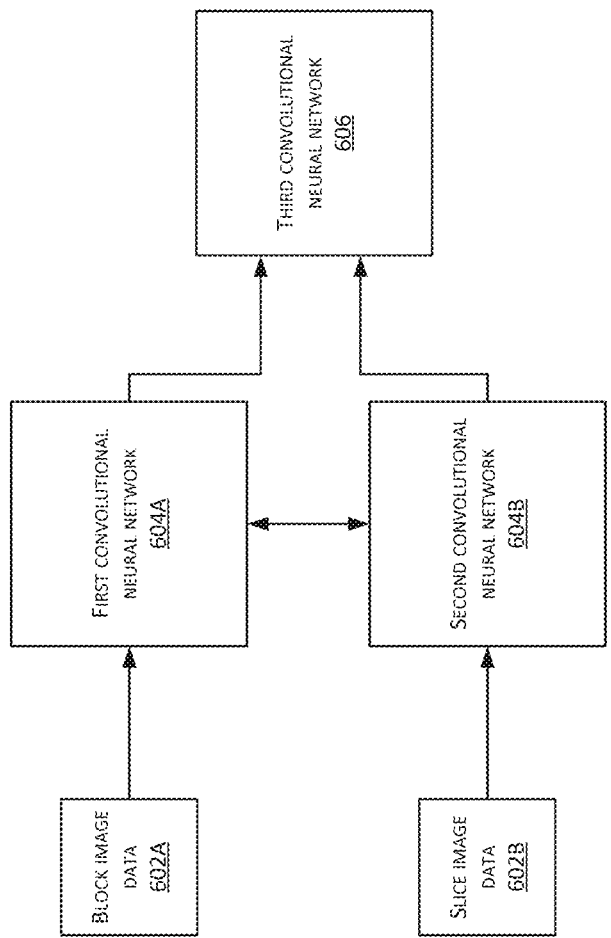
FIG. 6 depicts a schematic diagram of an image analysis module, including multiple convolution networks in accordance with aspects of the present disclosure.

FIG. 6 depicts a schematic diagram of an image analysis module 600, including multiple neural networks in accordance with aspects of the present disclosure. The image analysis module 600 may be a Siamese network which can measure the degree of similarity between the feature space (e.g., embedding) of block image data and the feature space of slice image data. The image analysis module 600 may include a first convolutional neural network 604A for processing the block image data 602A and a second convolutional neural network 604B for processing the slice image data 602B. In some embodiments, the first convolutional neural network 604A and the second convolutional neural network 604B may be identical twin architectures. The image analysis module 600 may include a third convolutional neural network 606 for processing the output of the first convolutional neural network 604A and the output of the second convolutional neural network 604B. In some embodiments, one or more of the convolutional neural networks may be a generative adversarial network. It will be understood that the image analysis module 600 can include more, less, or different convolutional neural networks.

The block image data 602A and the slice image data 602B may differ based on rotation, flipping, color, outline, etc. For example, the slice of tissue affixed to the slide may be rotated or flipped relative to the tissue block. Further, the slice of tissue may be stained with one or more colors that are different from the colors of the tissue block. In other examples, the slice of tissue may have a different perimeter size than the tissue block. In order to identify a level of similarity between the block image data 602A and the slice image data 602B, the image analysis module 600 can perform image analysis.

The image analysis module 600 can perform a multifaceted image analysis. Further, the image analysis module 600 can divide the image analysis into multiple facets. One or more facets of the image analysis can include preprocessing the block image data 602A and/or the slice image data 602B. In some embodiments, the image analysis module 600 may include one or more convolutional neural networks to perform the preprocessing. The image analysis module 600 can include an image registration algorithm to modify (e.g., rotate, flip, etc.) one or more of the block image data 602A and/or the slice image data 602B. By modifying one or more of the block image data 602A and/or the slice image data 602B, the image registration algorithm can generate modified block image data and/or modified slice image data that are rotated and/or flipped in the same manner. The image analysis module 600 can include an image segmentation algorithm to extract the tissue outlines of the block image data 602A and/or the slice image data 602B. In some embodiments, a U-net convolutional neural network can perform the image segmentation algorithm.

The first convolutional neural network 604A may learn the feature space of the block image data 602A and the second convolutional neural network 604B may learn the feature space of the slice image data 602B. The first convolutional neural network 604A and the second convolutional neural network 604B may use one or more imaging algorithms to learn the feature space. The first convolutional neural network 604A and the second convolutional neural network 604B may share one or more weights in order to learn the feature spaces. In some embodiments, one or more of the first convolutional neural network 604A or the second convolutional neural network 604B may perform at least a portion of the preprocessing. The first convolutional neural network 604A and the second convolutional neural network 604B may output the feature space to the third convolutional neural network 606 for additional processing. The third convolutional neural network 606 can compare the feature space of the block image data 602A and the feature space of the slice image data 602B for similarities. Based at least in part on this comparison, the third convolutional neural network 606 can determine a likelihood that the slide of the slice of the tissue block corresponds to the tissue block (e.g., whether the slice could have been generated from the tissue block).

Analyzing the Block Image Data and the Slice Image Data

Figure 7:
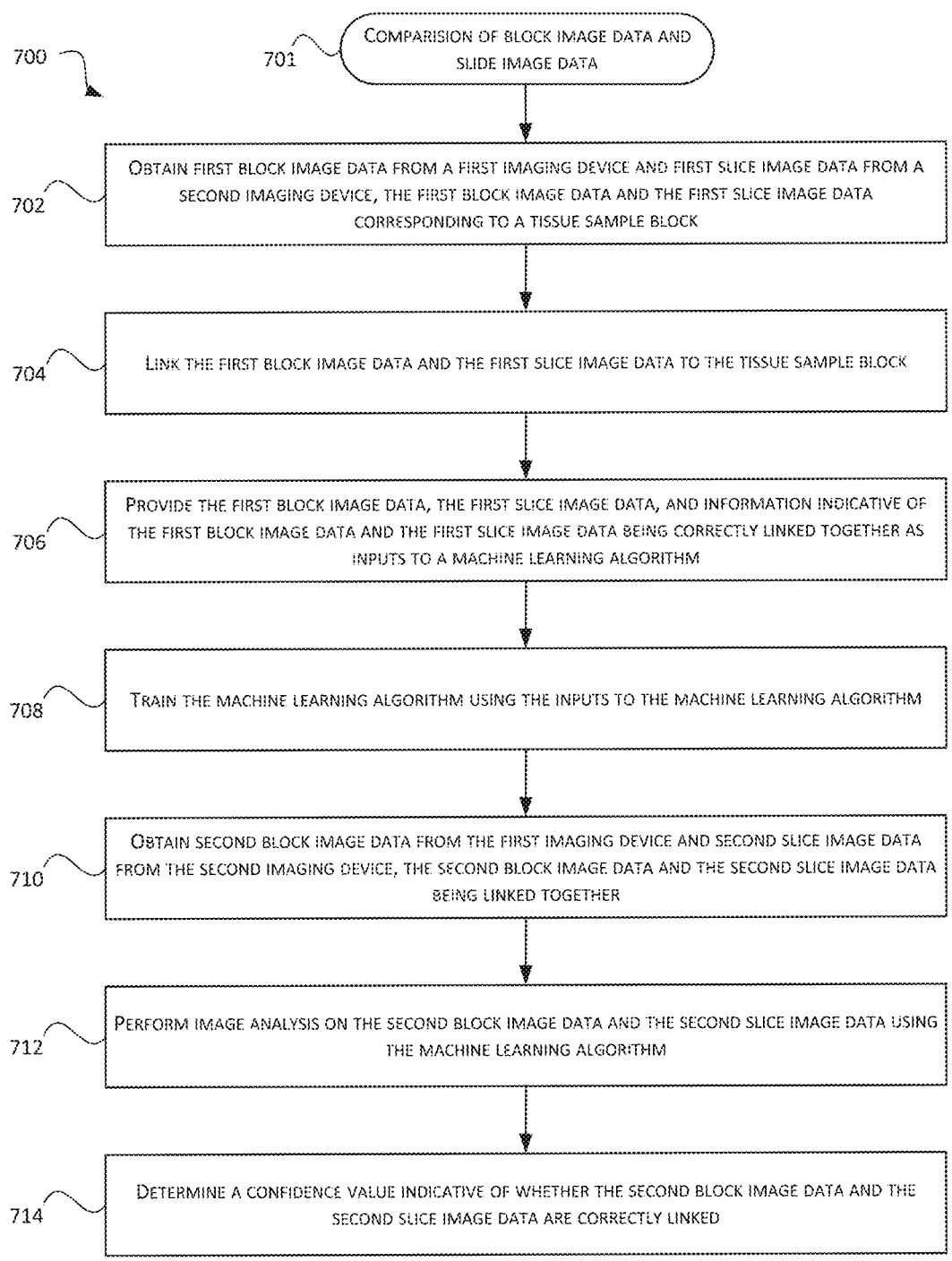
FIG. 7 is a flowchart of an example routine for performing image analysis on image data from a tissue simple block and a slice of the tissue sample block affixed to a slide according to some embodiments.

FIG. 7 shows a method 700 executed by an image analysis system, according to some examples of the disclosed technologies. The image analysis system may be similar, for example, to the image analysis system 104, and may include an image analysis module to perform one or more image analysis algorithms, a microtome, a coverslipper, a stainer, one or more imaging devices, etc. It will be understood that the method 700 may be performed by different devices (e.g., a computing device). The process 700 may begin at block 701. The process 700 may begin automatically upon receiving image data.

In block 702, the image analysis system obtains first block image data from a first imaging device and first slice image data from a second imaging device. The first imaging device may scan a tissue sample block and generate block image data based on scanning the tissue sample block. The tissue sample block may further be sliced in order to generate one or more slices of the tissue sample block. The one or more slices of the tissue sample block may be affixed to one or more slides. The second imaging device may scan a slide of the one or more slides corresponding to a slice of the one or more slices of the tissue sample block and may generate slice image data based on the scanning of the slide. The tissue sample block may include one or more of a paraffin embedded tissue sample block, an OCT-embedded tissue sample block, a frozen tissue sample block, or a fresh tissue sample block. The first block image data and the first slice image data may correspond to the tissue sample block. The image analysis system may include a coverslipper and/or a stainer. The stainer may stain the slice of the tissue sample block to generate a stained slice. The coverslipper may display the stained slice in the slide. In some embodiments, the first imaging device and the second imaging device may be different imaging devices. In other embodiments, the first imaging device and the second imaging device may be the same imaging device. One or more of the first imaging device or the second imaging device may be a microtome, a cover-slipper, a case folder imaging station, a single slide imaging station, a dedicated low resolution imaging device, or a direct part ("DP") scanner.

In block 704, the image analysis system links the first block image data and the first slice image data to the tissue sample block. The image analysis system may link the first block image data and the first slice image data based on determining the first block image data and the first slice image data correspond to the tissue sample block. In order to determine the first block image data and the first slice image data correspond to the tissue sample block, one or more of the tissue sample block and the slice may be associated with an identifier. The linking of the first block image data and the first slice image data may be based at least in part on determining that an identifier of the tissue sample block corresponds to an identifier of the slice. The identifier may be one or more of a tag, a radio frequency identification ("RFID") tag, a Bluetooth tag, an identifier, a barcode, a label, a marker, or a stamp. In some embodiments, the image analysis system may receive an input indicating that the first block image data and the first slice image data are correctly linked together (e.g., from a data store, from memory, etc.). The image analysis system may link the first block image data and the first slice image data and may store information identifying that the first block image data and the first slice image data (e.g., in a data store, in memory, etc.).

In block 706, the image analysis system provides the first block image data, the first slice image data, and information indicative of the first block image data and the first slice image data being correctly linked together as inputs to a machine learning algorithm. In providing the first block image data, the first slice image data, and information indicative of the first block image data and the first slice image data being correctly linked together, the image analysis system can train the machine learning algorithm to generate a trained machine learning algorithm.

In block 708, the image analysis system trains the machine learning algorithm using the inputs to the machine learning algorithm. Based on the image analysis system training the machine learning algorithm, the image analysis system can generate a trained machine learning algorithm. Further, the training of the machine learning algorithm may be based at least in part on a plurality of user data. The plurality of user data may include one or more responses by one or more users to one or more recommendations. For example, if a particular user rejects a recommendation that links particular block image data and particular slice image data, the image analysis system may not recommend that the block image data and the slice image data be linked together for a subsequent user. Further, the image analysis system may alter subsequent recommendations for the user based on the rejection (e.g., the image analysis may be less likely to make recommendations for the linking of block image data and slice image data). The machine learning algorithm may include one or more of an image differencing algorithm, a spatial analysis algorithm, a pattern recognition algorithm, a shape comparison algorithm, a color distribution algorithm, a blob detection algorithm, a template matching algorithm, a SURF feature extraction algorithm, an edge detection algorithm, a keypoint matching algorithm, a histogram comparison algorithm, or a semantic texton forest algorithm. In some embodiments, the trained machine learning algorithm may be a trained convolutional neural network. The machine learning algorithm may include extracting a first plurality of features from the second block image data and a second plurality of features from the second slice image data. The first plurality of features and the second plurality of features may each include one or more of a plurality of filters or a plurality of patterns. Further, the machine learning algorithm may compare the first plurality of features and the second plurality of features.

In block 710, the image analysis system obtains second block image data from the first imaging device and second slice image data from the second imaging device. The second block image data and the second slice image data may be linked together In block 712, the image analysis system performs image analysis on the second block image data and the second slice image data using the trained machine learning algorithm. In some embodiments, the image analysis system may perform image analysis on a third slice image data and the second block image data. In other embodiments, the image analysis system may perform image analysis on a third slice image data and the second slice image data. The image analysis system may perform image analysis on any combination of slice image data and block image data.

In block 714, the image analysis system determines a confidence value indicative of whether the second block image data and the second slice image data are correctly linked. In some embodiments, the image analysis system can obtain a confidence threshold associated with a user and compare the confidence value with the confidence threshold. Based on this comparison, the image analysis system may generate a recommendation for the user. The recommendation may include a similarity score, ranking, etc. Further, the image analysis system may transmit the recommendation to a user computing device (e.g., through an application programming interface) associated with the user for presentation to the user. In some embodiments, the image analysis system may cause display of the recommendation via the user computing device. Further, the image analysis system can obtain a response to the recommendation indicating that the user accepted the recommendation and adjust the confidence threshold based on the response. In some embodiments, the response may indicate that the user rejected the recommendation and the image analysis may adjust the confidence threshold based on the response. Further, the image analysis system may adjust the machine learning algorithm based on the response. In some embodiments, the confidence threshold can be associated with a plurality of users. Further, the image analysis system can determine the confidence threshold based on a plurality of characteristics associated with the plurality of users.

Figure 8:
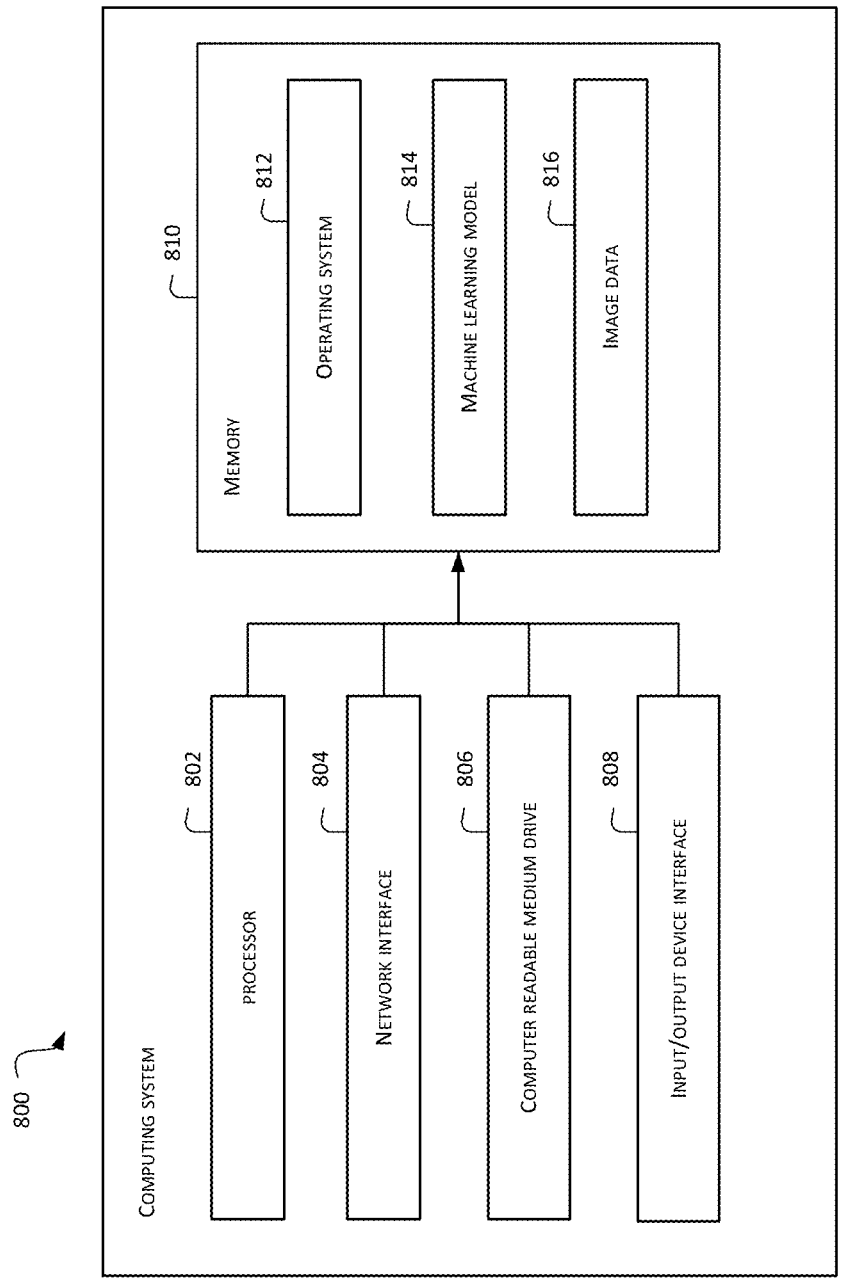
FIG. 8 shows an example computing device that may be used to implement aspects of the present disclosure.

FIG. 8 illustrates an example computing system 800 configured to execute the processes and implement the features described above. In some embodiments, the computing system 800 may include: one or more computer processors 802, such as physical central processing units ("CPUs"); one or more network interfaces 804, such as a network interface cards ("NICs"); one or more computer readable medium drives 806, such as a high density disk ("HDDs"), solid state drives ("SDDs"), flash drives, and/or other persistent non-transitory computer-readable media; an input/output device interface 808, such as an input/output ("IO") interface in communication with one or more microphones; and one or more computer readable memories 810, such as random access memory ("RAM") and/or other volatile non-transitory computer-readable media.

The network interface 804 can provide connectivity to one or more networks or computing systems. The computer processor 802 can receive information and instructions from other computing systems or services via the network interface 804. The network interface 804 can also store data directly to the computer-readable memory 810. The computer processor 802 can communicate to and from the computer-readable memory 810, execute instructions and process data in the computer readable memory 810, etc.

The computer readable memory 810 may include computer program instructions that the computer processor 802 executes in order to implement one or more embodiments. The computer readable memory 810 can store an operating system 812 that provides computer program instructions for use by the computer processor 802 in the general administration and operation of the computing system 800. The computer readable memory 810 can further include computer program instructions and other information for implementing aspects of the present disclosure. For example, in one embodiment, the computer readable memory 810 may include a machine learning model 814. As another example, the computer-readable memory 810 may include image data 816. In some embodiments, multiple computing systems 800 may communicate with each other via respective network interfaces 804, and can implement multiple sessions each session with a corresponding connection parameter (e.g., each computing system 800 may execute one or more separate instances of the process 700), in parallel (e.g., each computing system 800 may execute a portion of a single instance of a process 700), etc.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of comparing a block histological sample and a slice histological sample have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of comparing a block histological sample and a slice histological sample have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims. In some embodiments, the image analysis systems disclosed herein can be used to analyze images of other samples different than a histological sample.

What is claimed is:

1. An image analysis apparatus, comprising:
   a first scanner configured to scan a tissue sample block and generate block image data based on the scanning of the tissue sample block;
   a second scanner configured to scan a slice of one or more slices of the tissue sample block and generate slice image data based on the scanning of the slice; and
   a computing device configured to:
      obtain the block image data from the first scanner and the slice image data from the second scanner, the block image data and the slice image data being linked together;
      based on the block image data and the slice image data being linked together, perform image analysis on the block image data and the slice image data using a machine learning algorithm, wherein the machine learning algorithm is trained using predetermined training block image data and predetermined training slice image data linked with the predetermined training block image data; and determine, based on an output of the machine learning algorithm, a confidence value indicative of whether the block image data and the slice image data are correctly linked together.

2. The image analysis apparatus of claim 1, wherein to scan the tissue sample block, the first scanner is further configured to scan at least one side of the tissue sample block.

3. The image analysis apparatus of claim 1, wherein the predetermined training block image data and the predetermined training slice image data are obtained from at least one of a data store, the first scanner, or the second scanner and the predetermined training block image data and the predetermined training slice image data are linked together, wherein the machine learning algorithm is trained using the predetermined training block image data, the predetermined training slice image data, and information indicative of the predetermined training block image data and the predetermined training slice image data being correctly linked together.

4. The image analysis apparatus of claim 1, wherein, to obtain the block image data and the slice image data, the computing device is configured to:
obtain the block image data and the slice image data from a data store.

5. The image analysis apparatus of claim 4, wherein the block image data and the slice image data are linked together in the data store.

6. The image analysis apparatus of claim 1, wherein the computing device is further configured to:
obtain a confidence threshold associated with a user;
compare the confidence value and the confidence threshold; and
based at least in part on the comparing of the confidence value and the confidence threshold, generate a recommendation for the user indicative of whether the block image data and the slice image data are correctly linked together.

7. The image analysis apparatus of claim 6, wherein the computing device is further configured to:
obtain a response to the recommendation; and
adjust at least one of the machine learning algorithm or the confidence threshold based on the response to the recommendation.

8. The image analysis apparatus of claim 1, wherein the computing device is configured to perform the image analysis using the machine learning algorithm by providing the block image data and the slice image data to a trained convolutional neural network, wherein the trained convolutional neural network is configured to perform the image analysis.

9. The image analysis apparatus of claim 1, wherein the computing device is further configured to:
extract a first plurality of features from the block image data, wherein the first plurality of features comprise one or more of a first plurality of filters or a first plurality of patterns; and
extract a second plurality of features from the slice image data, wherein the second plurality of features comprise one or more of a second plurality of filters or a second plurality of patterns,
wherein the performing of the image analysis using the machine learning algorithm comprises comparing the first plurality of features and the second plurality of features.

10. The image analysis apparatus of claim 1, wherein the computing device is configured to perform the image analysis by using one or more of:
an image differencing algorithm;
a spatial analysis algorithm;
a pattern recognition algorithm;
a shape comparison algorithm;
a color distribution algorithm;
a blob detection algorithm;
a template matching algorithm;
a SURF feature extraction algorithm;
an edge detection algorithm;
a keypoint matching algorithm;
a histogram comparison algorithm; or
a semantic texton forest algorithm.

11. The image analysis apparatus of claim 1, further comprising:
a stainer configured to stain the slice of the tissue sample block to generate a stained slice; and
a coverslipper configured to generate a slide of the stained slice,
wherein the second scanner is configured to scan the stained slice.

12. The image analysis apparatus of claim 1, wherein the tissue sample block is associated with a first identifier and the slice of the tissue sample block is associated with a second identifier, wherein linking of the block image data and the slice image data is based at least in part on the first identifier corresponding to the second identifier.

13. A non-transitory computer-readable medium storing computer-executable instructions that, when executed by one or more computing devices, cause the one or more computing devices to:
obtain block image data from a first scanner and slice image data from a second scanner, the block image data and the slice image data being linked together, wherein the first scanner is configured to scan a tissue sample block and generate the block image data based on the scanning of the tissue sample block, and wherein the second scanner is configured to scan a slice of one or more slices of the tissue sample block and generate the slice image data based on the scanning of the slice;
based on the block image data and the slice image data being linked together, perform image analysis on the block image data and the slice image data using a machine learning algorithm, wherein the machine learning algorithm is trained using predetermined training block image data and predetermined training slice image data linked with the predetermined training block image data; and
determine, based on an output of the machine learning algorithm, a confidence value indicative of whether the block image data and the slice image data are correctly linked together.

14. The non-transitory computer-readable medium of claim 13, wherein the tissue sample block comprises one or more of:
a paraffin embedded tissue sample block;
a OCT-embedded tissue sample block;
a frozen tissue sample block; or
a fresh tissue sample block.

15. The non-transitory computer-readable medium of claim 13, the non-transitory computer-readable medium storing further computer-executable instructions that, when executed by the one or more computing devices, cause the one or more computing devices to:

obtain the second slice image data from a third scanner and second block image data from the first scanner, wherein the third scanner is configured to scan a second slice of the one or more slices of the tissue sample block and generate second slice image data based on the scanning of the second slice;

link the second block image data and the second slice image data together; and provide the second block image data, the second slice image data, and information indicative of the second block image data and the second slice image data being correctly linked together as further inputs to the machine learning algorithm.

16. The non-transitory computer-readable medium of claim 13, wherein the first scanner corresponds to a microtome, wherein the second scanner corresponds to one or more of:

the microtome;
a cover-slipper;
a case folder imaging station;
a single slide imaging station;
a dedicated low resolution imaging device; or
a digital pathology scanner.

17. The non-transitory computer-readable medium of claim 13, the non-transitory computer-readable medium storing further computer-executable instructions that, when executed by the one or more computing devices, cause the one or more computing devices to:

obtain a response to a recommendation; and
adjust at least one of the machine learning algorithm or a confidence threshold based on the response to the recommendation.

18. A computer-implemented method comprising:

obtaining block image data from a first scanner and slice image data from a second scanner, the block image data and the slice image data being linked together, wherein the first scanner is configured to scan a tissue sample block and generate the block image data based on the scanning of the tissue sample block, and wherein the second scanner is configured to scan a slice of one or more slices of the tissue sample block and generate the slice image data based on the scanning of the slice;

based on the block image data and the slice image data being linked together, performing image analysis on the block image data and the slice image data using a machine learning algorithm, wherein the machine learning algorithm is trained using predetermined training block image data and predetermined training slice image data linked with the predetermined training block image data; and determining, based on an output of the machine learning algorithm, a confidence value indicative of whether the block image data and the slice image data are correctly linked together.

19. The computer-implemented method of claim 18, wherein the tissue sample block comprises one or more of:

a paraffin embedded tissue sample block;
a OCT-embedded tissue sample block;
a frozen tissue sample block; or
a fresh tissue sample block.

20. The computer-implemented method of claim 18, further comprising:

obtaining the second slice image data from a third scanner and second block image data from the first s, wherein the third scanner is configured to scan a second slice of the one or more slices of the tissue sample block and generate second slice image data based on the scanning of the second slice;

linking the second block image data and the second slice image data together; and providing the second block image data, the second slice image data, and information indicative of the second block image data and the second slice image data being correctly linked together as further inputs to the machine learning algorithm.

* * * * *